3,786,159
PROCESS OF MANUFACTURING ALCOHOL-CONTAINING SOLID MATTER
Jinichi Sato, Nagoya, and Tosiro Kurusu, Niwa-gun, Japan, assignors to Sato Shokuhin Kogyo Kabushiki Kaisha, Komaki-shi, Japan
No Drawing. Filed Dec. 13, 1971, Ser. No. 207,659
Claims priority, application Japan, Dec. 18, 1970, 45/114,585
Int. Cl. A23l 1/04
U.S. Cl. 426—302          8 Claims

ABSTRACT OF THE DISCLOSURE

A solution of alcohol, water and a water-soluble product is formed, the water-soluble product being present in an amount more than 70% by weight of the water and more than 100% by weight of the alcohol. The solution is spray-dried at the lowest possible temperature to obtain a powder product in which the water is substantially removed and the alcohol is contained within a coating of the water-soluble product.

BACKGROUND OF THE INVENTION (a) Field of the invention

This invention relates to a process of manufacturing solid matter containing alcohol in high concentration by means of simple technical expedients and inexpensive raw materials.

(b) Description of the prior art

It has been hitherto taken for granted that it is not possible to remove only water from a solution of alcohol and water, because the alcohol is lower in boiling point and higher in volatility in comparison with water.

SUMMARY OF THE INVENTION

According to this invention however, solid matter such as a powder or the like containing alcohol can be mass-produced by simple technical steps and because the product obtained is solid, it can be widely used in foodstuffs, medicines, confectionery or the like.

According to the process of this invention, a solution is formed of a mixture of alcohol, water and a water-soluble material, the water soluble material being present in an amount more than 70% by weight as compared to the water and more than an equal amount by weight as compared to the alcohol, the solution is spray-dried at the least possible temperature, and there is obtained a solid product in which almost all of the water is removed and the alcohol is covered with and held in the water-soluble material.

The water-soluble material in this invention may be gelatin or one or more modified starches which are easily water-soluble such as "mizuame," i.e. starch converted syrup, dextrin, gelatinized oxidized starch, ester starch, ether starch or the like or a mixture of the modified starches and gelatin.

The alcohol component of the solution may be an alcoholic beverage such as wine. If, in this case, the alcoholic beverage contains a saccharide, protein, salt or the like, the amount of the water-soluble material to be added can be accordingly decreased. Namely, it is sufficient if the total amount of these materials previously contained in the alcoholic beverage and the water-soluble material which is to be added exceeds 70% by weight of the water component.

The mechanism wherein only the water can be removed while there remains the alcohol, which has a lower boiling point than water, is presumed to be achieved in the process of the invention as follows: Namely, if alcohol and water are mixed together in a suitable mixing ratio (for example, 4:6), they are dissolved together to form a uniform alcohol-aqueous solution. If a water-soluble material such as gelatin, dextrin or the like having a coating-forming ability is added to and mixed with the alcohol-aqueous solution and if the amount thereof is gradually increased, the density of the water-soluble material in the alcohol-aqueous solution becomes gradually increased. The water soluble material such as gelatin, dextrin or the like is not soluble in alcohol but has a very large affinity with water, so that the same is dissolved in the existing water, and if the water-soluble material is added to and dissolved in the water in an amount of about 1.5 or more times as the water, almost all of the existing water is combined with the water soluble material, whereby a homogeneous system comprising the three components of alcohol, water-soluble material and water becomes a two-component system comprising alcohol and water-containing water-soluble material, that is, one component being a combined body of water and water-soluble material. If this system is mixed and stirred, there is formed a dispersion system such as a kind of colloid solution in which the alcohol is dispersed in the combined body of water and water-soluble material.

If, accordingly, this solution, which is a thick mixture solution, is sprayed, there are formed fine liquid drops in each of which the alcohol is located at the center and the combined body of water and water-soluble material exists therearound. If such a drop is instantaneously dried, the water component is evaporated from the combined body of water and water-soluble material and at the same time the water-soluble material is solidified by drying and forms a coating surrounding the alcohol whereby the alcohol is prevented from being evaporated and is held within the coating.

Thus, it becomes possible to remove only the water from an alcohol-aqueous solution, and an alcohol-containing solid product such as powder or the like can be manufactured easily and economically. It will be understood that in this operation the relative quantity of the three components of alcohol, water and water-soluble material, and the qualitative condition such as viscosity, solubility or the like of the water-soluble material have a natural relationship and a certain permissable range thereof.

An important condition in the process of the invention, is that the total amount of the water-soluble material component is above 70% as compared to the water and this has been confirmed by various experiments and will be explained with reference to the experimental examples as follows.

EXPERIMENTAL EXAMPLE 1

In this experimental example gelatin and one powdered starch converted syrup (which will be called "starch converted powder" hereafter) are used as the water-soluble component and ethyl alcohol is used as the alcohol component. Into alcohol aqueous solutions, each of which has the ratio of alcohol to water as shown in the following table, respective mixtures each comprising powder gelatin and starch converted powder in a mixing ratio of 1:1, are adde and dissolved while being agitated in a mixing ratio of 130%, 90%, 70%, 50% and 30% in relation to the amount of water. Thereafter, each of the solutions is heated to 70° C. within a tightly closed container, without causing volatilization of the alcohol, and is then spray-dried in a drying chamber at a temperature of 75° C. As a result thereof, there can be produced alcohol-containing powders as shown in the following table.

The gelatin used in 25 mp. (62/3%) in viscosity and has a 5% water content. The starch converted powder comprises 24% direct reducing sugar, 71% dextrin and 5% water.

| Number | 1 | 2 | 3 | 4 | 5 |
| --- | --- | --- | --- | --- | --- |
| Alcohol, kg | 105.3 | 72.9 | 56.7 | 40.5 | 24.3 |
| Water, kg | 100 | 100 | 100 | 100 | 100 |
| Powder gelatin, kg | 65 | 45 | 35 | 25 | 15 |
| Starch converted powder, kg | 65 | 45 | 35 | 25 | 15 |
| Ratio of total amount of powder gelatin and starch converted powder to water, percent | 130 | 90 | 70 | 50 | 30 |
| Ratio of total amount of powder gelatin and starch converted powder to alcohol, percent | 123.5 | 123.5 | 123.5 | 123.5 | 123.5 |
| Produced powder amount, kg | 222.1 | 153.7 | 111.1 | 60.1 | 30 |
| Alcohol content in produced powder, percent | 41.5 | 41.5 | 37.0 | 16.8 | 0 |
| Alcohol remaining ratio, percent | 87.5 | 87.3 | 72.5 | 25.0 | 0 |

Here, the alcohol remaining ratio is obtained from the initial alcohol amount and the remaining alcohol amount (the amount of the powder produced multiplied by the percent of alcohol in the produced powder).

In this experimental example, dextrin obtained by enzymatic amylolysis of starch (hereinafter called "enzymatic amylolysis dextrin") is used as the water-soluble material component. Into alcohol aqueous solutions, each of which has the ratio of alcohol to water as shown in the following table, the respective enzymatic amylolysis dextrins (D.E.=12%) of 130%, 90%, 70%, 50% and 30% relative to the water amount are added and dissolved while being agitated. Then, the solution is spray-dried at a chamber temperature of 75° C., whereby there can be obtained alcohol-containing powders as shown in the following table.

| Number | 1 | 2 | 3 | 4 | 5 |
| --- | --- | --- | --- | --- | --- |
| Alcohol, kg | 65 | 45 | 35 | 25 | 15 |
| Water, kg | 100 | 100 | 100 | 100 | 100 |
| Enzymatic amylolysis dextrin, kg | 130 | 90 | 70 | 50 | 30 |
| Ratio of dextrin to water, percent | 130 | 90 | 70 | 50 | 30 |
| Ratio of dextrin to alcohol, percent | 200 | 200 | 200 | 200 | 200 |
| Produced powder amount, kg | 190.8 | 131.6 | 94.4 | 53.3 | 30.0 |
| Alcohol content in produced powder, percent | 31.9 | 31.6 | 25.8 | 6.2 | 0.0 |
| Alcohol remaining ratio, percent | 93.5 | 92.5 | 69.7 | 13.1 | 0.0 |

It has been confirmed from these experiments that the alcohol remaining ratio is high when the water-soluble material is present in an amount more than 70% as compared to water, and if it is below this percentage, the alcohol remains in only a very low yield rate and it is not suitable for industrial production.

Also with gelatinized oxidized starch which is, among water-soluble materials, one of the typical ones, almost the same result as the above is obtained in respect of the alcohol remaining ratio, though there is a little difference in viscosity therebetween. As can be judged from these experimental examples, the greater the quantity of the water soluble material in the mixture solution, the greater the ratio of remaining alcohol. However, the thicker the mixture solution, the higher its viscosity and the greater the difficulty in spraying. Accordingly, it is often required that, from various kinds of water-soluble materials different in polymerization degree, one or more kinds are selected and mixed together for being adjusted to a proper range of viscosity. Generally, when a low viscosity (low polymerization degree) material is selected, the produced powder is high in water solubility but is poor in moisture-proof property. If a high viscosity (high polymerization degree) material is selected, the produced powder is excellent in moisture-proof property, but is low in water solubility. Accordingly, such a selection should be made, according to the purpose.

The water-soluble material plays the most important part in the process according to the invention, and the inventors have made various tests and it has been found as a result thereof that modified starch such as dextrin, gelatinized oxidized starch, starch converted syrup, or the like, or gelatin or a mixture thereof is most suitable, and in this case the remaining alcohol ratio is high and the product when dissolved in water is nearly tasteless and odorless. Thus, when for example, an alcoholic beverage is used, the inherent characteristic taste thereof is not affected.

As is well known, gelatin is a thermal decomposition production of collagen contained in bone, skin, connective tissue of animals and is a kind of protein derivative, and it has the property that it becomes a sol solution if dissolved in water and is gelled at 20–25° C. and is easily dissolved in a mixture solution of water and alcohol. The modified starch, which may be enzymatic amylolysis dextrin, acid hydrolysis dextrin, gelatinized oxidized starch, starch converted syrup or powder, or the like, is obtained by modifying raw material starch so as to be soluble in water at high density and at low viscosity due to the lowering of the polymerization degree thereof.

In the case of the mixture solution being gelatin as the water soluble material, it is preferable that the mixture solution is heated to nearly the liquefaction temperature of the gelatin so as to cause the gelatin to be dissolved rapidly in water, and then the mixture is spray-dried while is kept at that temperature or at slightly more elevated temperature. It becomes possible by this heating to insure that the mixture solution containing gelatin at high density is obtained with a low viscosity, so that the added amount of gelatin can be increased and accordingly the alcohol remaining ratio can be improved.

The mixture solution is sprayed at the lowest possible temperature in order that the evaporation loss of alcohol at the time of drying should be restricted to a minimum.

It will be readily understood that an important condition in the process of the invention is that the water-soluble material component is present in an amount equal or greater than the alcohol component so that the alcohol must be covered with and held in the coating of the water-soluble material. Namely, if the water-soluble material for coating and holding the alcohol is present in a small amount, the excess alcohol evaporates and the remaining ratio thereof is decreased. This has been confirmed by the following experiment.

In this experimental example gelatin and starch converted powder are used as the water-soluble component and ethyl alcohol is used as the alcohol component as in the case of Experimental Example 1. To the alcohol aqueous solutions, each of which has the ratio of alcohol to water as shown in the following table, respective mixtures of powder gelation and starch converted powder having the ratio of 1:1 are added in a mixing ratio of 520%, 280%, 160%, 100% and 70% in relation to the alcohol amount. Each of the resultant mixture solutions is spray-dried as in Experimental Example 1 and there are obtained the powders as shown in the following table.

| Number | 1 | 2 | 3 | 4 | 5 |
| --- | --- | --- | --- | --- | --- |
| Alcohol, kg | 100 | 100 | 100 | 100 | 100 |
| Water, kg | 530.4 | 285.6 | 163.2 | 102.0 | 71.4 |
| Powder gelatin, kg | 260 | 140 | 80 | 50 | 35 |
| Starch converted powder, kg | 260 | 140 | 80 | 50 | 35 |
| Ratio of total amount of powder gelatin and starch converted powder to alcohol, percent | 520 | 280 | 160 | 100 | 70 |
| Ratio of total amount of powder gelatin and starch converted powder to water, percent | 98.0 | 98.0 | 98.0 | 98.0 | 98.0 |
| Produced powder amount, kg | 614.2 | 373.2 | 250.8 | 170.3 | 123.6 |
| Alcohol content in produced powder, kg | 15.3 | 25.0 | 36.2 | 41.3 | 43.4 |
| Alcohol remaining ratio, percent | 94.2 | 93.2 | 90.8 | 70.3 | 53.6 |

As seen from the above table there is a sharp drop-off in alcohol remaining ratio when the water-soluble component is present in an amount less than 100% as compared to the alcohol component.

Now, the excellent effects in this invention process will be enumerated below.

(1) If the composition of the mixture solution is determined so as to comply with the conditions of this invention, mass-production becomes possible easily and economically by the use of existing spray drying apparatus.

(2) Since the drying is carried out at the lowest possible temperature and ends instantly, especially when an alcoholic beverage is used, volatile substances especially the alcohol soluble substances present in the alcoholic beverage, remain along with the alcohol component and, additionally, other flavoring substances contained in the alcoholic beverage are virtually unchanged in quality due to heat, oxidization or the like and thus a solid alcoholic beverage product having the natural original flavors of the alcohol beverage can be obtained.

(3) As the water-soluble material to be added has no objectionable smell, is harmless and inexpensive and has high water-solubility, the solid matter product obtained by this invention is very soluble in water, and when dissolved in water, it becomes transparent and presents virtually no increase in viscosity and thus an excellent instant alcohol beverage can be obtained.

As the solid matter product obtained by the process of invention is generally made in a powder form, it can be used as an additive for foodstuffs, confectionery or the like. The powder may be distributed uniformly in a product or it may be concentrated in a part thereof. As for other manner of uses, the powder may be formed into any desired shape such as a granulate, lump or tablet with or without a binder, a vehicle, or the like. Additionally, there can be added to the product any desired material such as cane sugar or other saccharide, seasonings, spices, coloring matter, medicines, nutrients, etc.

DESCRIPTION OF PREFERRED EMBODIMENTS

Example 1

10 kg. of ordinary rye whisky comprising 43% alcohol and 57% water is mixed with 5.4 kg. of edible fine powder gelatin below 100 mesh and the mixture is heated to 35° C. so that the gelatin is dissolved. The resultant solution is heated to 65° C. and is spray-dried in a drying chamber at a temperature of 70° C., whereby 9.0 kg. of whisky powder containing 40.0% alcohol is obtained. This powder is such that only the water component has been removed from the whisky and almost all of the alcohol component and other flavoring components remain without being volatilized and are held at high content in the powder. Since the powder is comparatively low in volatilization loss even when placed in the atmosphere, a proper amount of a binder can be added and the powder formed into an edible tablet. A whisky flavored chewing gum can be produced by adding the powder to a chewing gum base. Thus the use of the powder is very wide, and for example, it can also be used as a raw material for various kinds of confectionery, instant drinks or the like.

Example 2

Added to 10 kg. of "mirin" sake comprising 22% alcohol, 14.8% saccharose, 0.2% protein and 63% water, were 4 kg. edible powder gelatin and the gelatin is dissolved by heating the mixture. Then, the resultant mixture solution is heated to 70° C. and is spray-dried at a chamber temperature of 65° C., whereby a powder of 7.4 kg. containing 25.7% alcohol is obtained. If this powder is dissolved in water, it is restored to a product having substantially the same flavor as the original sake. Thus, the product can be advantageously used as a stock for an instant soup, or as a raw material for addition to seafood products such as a fish cake, or the like.

Example 3

10 kg. of brandy containing 40% of alcohol is mixed with 20 kg. white wine containing 13% alcohol, 13% saccharose. 0.1% protein and 0.1% ash and 3 kg. of lemon essence and dissolved to make a cocktail. 6 kg. of starch converted powder and 6.4 kg. of edible gelatin powder are added thereto and are dissolved therein by being heated to 40° C. The resultant mixture solution is heated to 70° C. and spray-dried at a chamber temperature of 80° C., wherein 21 kg. of a powder containing 29% alcohol is obtained. If a raw material base for candy is added and mixed with a proper amount of the obtained cocktail powder and is molded, a cocktail-like candy product can be obtained.

Example 4

10 kg. of sake comprising 16.1% alcohol, 78.5% water, 5% saccharose and 0.4% protein is mixed with 10 kg. of enzymatic amylolysis dextrin and is stirred to dissolve the dextrin in the sake. The resultant mixture solution is spray-dried at a chamber temperature of 75° C., whereby there is obtained 11.5 kg. of powder containing 12.5% alcohol. The resulting powder corresponds to the original product with only the water removed therefrom, so that the powder contains not only substantially all the alcohol component but also the other brewed flavoring components. The powder can be eaten in the powder form or compressed into any desired shape, and if dissolved in water will provide an instant sake.

Example 5

100 kg. of orange curacao comprising 37.4% water, 30% alcohol and 32.6% saccharose is mixed with 35 kg. gelatinized and dried oxidized starch and 0.5 kg. low viscosity CMC and these additives are dissolved while being agitated. The resultant mixture solution is then spray-dried at a chamber temperature of 80° C. whereby there is obtained 94 kg. of powder containing 29% alcohol.

This orange curacao powder can be used as a raw material for foodstuffs and confectionery, and becomes orange curacao if dissolved in water.

Example 6

10 kg. of brandy containing 40% alcohol, and 20 kg. white wine containing 13% alcohol, 13% sugar, 0.1% protein and 0.1% ash are mixed and added thereto is 2.4 kg. refined sugar and 0.03 kg. lemon essence as to make a cocktail. 4 kg. enzymatic amylolysis dextrin and 4 kg. gelatinized and dried oxidized starch are added thereto and dissolved therein while being agitated. The resultant mixture solution is then spray-dried at a temperature chamber of 80° C., to obtain 21 kg. of powder containing 29% alcohol.

This cocktail powder can be formed into a palatable tablet by being mixed with a binding agent and tabletted. The powder becomes an instant cocktail if it is dissolved in water.

Example 7

(a) 10 kg. draught beer comprising 4.2% alcohol, 0.5% protein, 3.1% saccharose, 0.1% ash and 92.1% water is mixed with 10.0 kg. acid hydrolysis dextrin containing 30% of direct reducing sugar. The resultant mixture solution is then spray-dried at a chamber temperature of 75° C., whereby there is obtained 10.4 kg. powder containing 3.7% alcohol.

(b) The 10.4 kg. powder obtained in the above at (a) is added to 10 kg. draught beer and is dissolved therein. The resultant mixture solution is then dried under the same condition as in (a) and there is obtained 10.7 kg. powder containing 6.6% alcohol.

(c) The 10.7 kg. of powder obtained in above at (b) is further added to 10 kg. draught beer and is dissolved therein. The resultant solution is then dried under the same condition as in (a), whereby there is obtained 11.0 kg. powder containing 9.3% alcohol.

(d) The 11.0 kg. of powder obtained in above at (c) is further added to 10 kg. draught beer and is dissolved therein. The resultant solution is then dried under the same condition as in (a), whereby there is obtained 11.3 kg. of powder containing 11.5% alcohol.

Thus, 11.3 kg. of draught beer powder containing 11.5% alcohol is obtained from 40 kg. draught beer and the alcohol concentration is increased about 3 times. If this draught beer powder is dissolved in carbonated water of about three times the amount or dissolved in water after being mixed with a small amount of a foaming or blowing agent such as a composite of baking soda and organic acid or the like, it forms draught beer.

Example 8

77 kg. vodka containing 70% alcohol is mixed with 23 kg. water and there is added to the mixture 100 kg. enzymatic amyloylsis dextrin. The resultant mixture solution is then spray-dried at a chamber temperature of 80° C., whereby there is obtained 148 kg. of a vodka powder containing 33% alcohol. If the powder is mixed with a chewing gum base and kneaded, it forms a vodka-containing chewing gum product.

What is claimed is:

1. A process of manufacturing an alcohol-containing solid product comprising forming in solution a mixture of alcohol, water and a water-soluble material, said water-soluble material being substantially insoluble in alcohol and capable of forming a coating on the alcohol, the water-soluble material being present in an amount more than 70% by weight compared to the water component and more than the same quantity by weight compared to the alcohol component and spray drying the mixture to remove substantially all the water and produce a solid product in which the alcohol is covered by and held in a coating of the water-soluble material.

2. A process as claimed in claim 1, wherein the water-soluble material is gelatin.

3. A process as claimed in claim 1, wherein the water-soluble material is one or more kinds of various modified starches which are water-soluble.

4. A process as claimed in claim 3 wherein said starch is starch-converted syrup or powder, dextrin, roasted oxidized starch, ester starch, or ether starch.

5. A process as claimed in claim 1, wherein the water-soluble material is gelatin and one or more modified starches.

6. A process as claimed in claim 1, wherein the alcohol in the mixture is an alcoholic beverage.

7. A process as claimed in claim 1 wherein the steps of the process are repeated at least a second time, the solid product obtained by the first process being used as the water-soluble material for the second process.

8. A process as claimed in claim 1 wherein said water-soluble material is selected from the group consisting of gelatin, modified starches, CMC, and mixtures thereof.

References Cited

UNITED STATES PATENTS

| | | | |
|---|---|---|---|
| 3,554,768 | 1/1971 | Feldman | 99—140 R |
| 3,644,127 | 2/1972 | Moores et al. | 99—140 R |
| 2,113,596 | 4/1938 | Lilienfeld | 99—30 |

A. LOUIS MONACELL, Primary Examiner

J. M. HUNTER, Assistant Examiner

U.S. Cl. X.R.

426—350, 365, 380, 471